United States Patent
Kim

(10) Patent No.: US 12,503,952 B2
(45) Date of Patent: Dec. 23, 2025

(54) TURBINE BLADE HAVING NON-AXISYMMETRIC ENDWALL CONTOUR AND GAS TURBINE INCLUDING SAME

(71) Applicant: DOOSAN ENERBILITY CO., LTD., Changwon (KR)

(72) Inventor: Jeong Ju Kim, Seongnam (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 0 days.

(21) Appl. No.: 19/001,489

(22) Filed: Dec. 25, 2024

(65) Prior Publication Data

US 2025/0264033 A1    Aug. 21, 2025

(30) Foreign Application Priority Data

Feb. 15, 2024    (KR) ........................ 10-2024-0021554

(51) Int. Cl.
  *F01D 11/08*    (2006.01)
  *F01D 5/14*    (2006.01)
(52) U.S. Cl.
  CPC ................ *F01D 11/08* (2013.01); *F01D 5/14* (2013.01); *F05D 2220/32* (2013.01); *F05D 2240/307* (2013.01); *F05D 2240/55* (2013.01)
(58) Field of Classification Search
  CPC ................ F01D 5/143; F05D 2250/70; F05D 2250/711; F05D 2250/71; F05D 2250/712; F05D 2250/611
  See application file for complete search history.

(56) References Cited

U.S. PATENT DOCUMENTS

| | | | |
|---|---|---|---|
| 9,103,213 B2 | 8/2015 | Barr | |
| 9,551,226 B2 * | 1/2017 | Smith | ..................... F01D 5/143 |
| 10,408,075 B2 | 9/2019 | Bunker | |
| 10,648,353 B2 | 5/2020 | Aggarwala | |
| 2010/0158696 A1 * | 6/2010 | Pandey | ..................... F01D 5/145 |
| | | | 416/243 |
| 2013/0004331 A1 | 1/2013 | Beeck | |
| 2016/0356161 A1 * | 12/2016 | Quach | ..................... F01D 5/187 |
| 2017/0218769 A1 * | 8/2017 | Venugopal | ............... F01D 5/145 |

FOREIGN PATENT DOCUMENTS

| | | |
|---|---|---|
| AU | 2013201301 A1 | 9/2013 |
| CA | 2808804 A1 | 9/2013 |
| CN | 103899364 B | 12/2015 |

(Continued)

OTHER PUBLICATIONS

European Search Report, dated Aug. 13, 2025, issued for a corresponding EP application.
Office Action From Korean Patent Office Dated Oct. 27, 2025.

*Primary Examiner* — Nathaniel E Wiehe
*Assistant Examiner* — Maxime M Adjagbe
(74) *Attorney, Agent, or Firm* — Harvest IP Law, LLP

(57) ABSTRACT

Proposed is a turbine blade which includes an airfoil including a pressure surface, a suction surface, a leading edge, and a trailing edge, an endwall formed integrally on a lower portion of the airfoil, and a root part formed integrally on a lower portion of the endwall, wherein an outer peripheral surface of the endwall is formed with a curved surface from a rim seal positioned at a first side of the endwall to a second end of the endwall.

12 Claims, 11 Drawing Sheets

(56) References Cited

FOREIGN PATENT DOCUMENTS

| | | |
|---|---|---|
| CN | 113006880 B | 2/2022 |
| CN | 112177679 B | 12/2022 |
| EP | 2935794 B1 | 7/2019 |
| JP | 4146257 B2 | 9/2008 |
| JP | 2013-502531 A | 1/2013 |
| JP | 2017-528632 A | 9/2017 |
| KR | 10-2019-0046118 A | 5/2019 |

* cited by examiner vortex vortex

TURBINE BLADE HAVING NON-AXISYMMETRIC ENDWALL CONTOUR AND GAS TURBINE INCLUDING SAME

CROSS REFERENCE TO RELATED APPLICATION

The present application claims priority to Korean Patent Application No. 10-2024-0021554, filed on Feb. 15, 2024, the entire contents of which are incorporated herein for all purposes by this reference.

BACKGROUND

1. Technical Field

The present disclosure relates to a turbine blade having a non-axisymmetric endwall contour and a gas turbine including the same.

2. Description of the Related Art

A turbine is a mechanical device that obtains rotational force through impulse or reaction force by utilizing the flow of compressible fluid such as steam or gas. Examples of the turbine include a steam turbine that uses steam and a gas turbine that uses high-temperature combustion gas.

Among these, the gas turbine is largely composed of a compressor, a combustor, and a turbine. The compressor is provided with an air inlet for introducing air, and a plurality of compressor vanes and a plurality of compressor blades are arranged alternately within a housing of the compressor.

The combustor supplies fuel to air compressed by the compressor and ignites the mixture of the fuel and air with a burner, thereby generating high-temperature, high-pressure combustion gas.

A turbine consists of a plurality of turbine vanes and a plurality of turbine blades arranged alternately within a turbine housing. In addition, a rotor is arranged to penetrate the center of the compressor, the combustor, the turbine, and an exhaust chamber.

The rotor is rotatably supported at opposite end portions by bearings. In addition, a plurality of disks is fixed to the rotor to connect each of the blades, and a drive shaft of a generator is connected to the end portion of the exhaust chamber.

Such a gas turbine does not have a reciprocating mechanism such as a piston in a four-stroke engine, and thus has no frictional part such as that of a piston and a cylinder, so the gas turbine is extremely low in the consumption of lubricating oil, has greatly reduced amplitude, which is a characteristic of a reciprocating mechanism,, and is capable of high-speed operation.

To briefly explain the operation of the gas turbine, air compressed by the compressor is mixed with fuel and combusted to produce high-temperature combustion gas, and the combustion gas produced in this way is injected toward the turbine. As the injected combustion gas passes through the turbine vanes and the turbine blades, rotational force is generated, causing the rotor to rotate.

In order to construct such a turbine, a configuration is widely used in which a plurality of turbine rotor disks is configured in multiple stages, with each of the turbine rotor disks having a plurality of turbine blades arranged on an outer circumferential surface thereof, so that the high-temperature, high-pressure combustion gas passes through the turbine blades.

Meanwhile, when the turbine blades are assembled on site, workers are required to assemble the multiple turbine blades from a first stage turbine to a last stage turbine, which results in assembly tolerances after a lot of time and work. In addition, as for the turbine blades, irregular steps or gaps are maintained between adjacently assembled turbine blades, and thus when combustion gas flows, issues caused by a secondary vortex are generated.

In a case in which the secondary vortex is generated when the combustion gas passes through the turbine blades, aerodynamic loss occurs on a suction surface or a pressure surface.

In this case, since the gas turbine has low efficiency, countermeasures are needed to ensure the stable movement of combustion gas.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a turbine blade, and a gas turbine including the same, which can improve aerodynamic performance by reducing a secondary vortex by forming a non-axisymmetric endwall contour having a plurality of convex portions and a plurality of concave portions from a rim seal at a leading edge side.

In order to achieve the above objective, a turbine blade of the present disclosure includes: an airfoil including a pressure surface, a suction surface, a leading edge, and a trailing edge; an endwall formed integrally on a lower portion of the airfoil; and a root part formed integrally on a lower portion of the endwall, wherein an outer peripheral surface of the endwall is formed as a curved surface from a rim seal positioned at a first side of the endwall to a second end of the endwall.

The endwall may include: a first rim seal extending upstream from a position of the leading edge; and a second rim seal extending downstream from a position of the trailing edge.

The outer peripheral surface of the endwall may be formed as a streamlined curved surface connected between the first rim seal and an end portion of the outer peripheral surface on a side of the trailing edge.

The second rim seal may be arranged to be lower than a radial height of a portion of the outer peripheral surface of the endwall connected to the trailing edge.

The outer peripheral surface of the endwall may be formed to have a highest radial height at a portion of the outer peripheral surface connected to the leading edge.

A radial height of the outer peripheral surface of the endwall may increase from the first rim seal to the portion of the outer peripheral surface connected to the leading edge and then decrease toward the trailing edge.

The outer peripheral surface of the endwall may include two concave parts positioned near an end edge of the pressure surface and positioned between a side portion of the leading edge and a side portion of the trailing edge.

The outer peripheral surface of the endwall may include two concave parts positioned near an end edge of the suction surface and positioned between a side portion of the leading edge and a side portion of the trailing edge.

A gas turbine of the present disclosure includes: a compressor configured to take in and compress external air; a combustor configured to mix fuel with the air compressed by the compressor and combust the fuel mixed with the air; and a turbine in which turbine blades and turbine vanes are mounted inside a turbine housing, with each of the turbine blades being rotated by combustion gas discharged from the combustor, wherein the turbine blade includes: an airfoil comprising a pressure surface, a suction surface, a leading edge, and a trailing edge; an endwall formed integrally on a lower portion of the airfoil; and a root part formed integrally on a lower portion of the endwall, wherein an outer peripheral surface of the endwall is formed as a curved surface from a rim seal positioned at a first side of the endwall to a second end of the endwall.

The endwall may include: a first rim seal extending upstream from a position of the leading edge; and a second rim seal extending downstream from a position of the trailing edge.

The outer peripheral surface of the endwall may be formed as a streamlined curved surface connected between the first rim seal and an end portion of the outer peripheral surface on a side of the trailing edge.

The second rim seal may be arranged to be lower than a radial height of a portion of the outer peripheral surface of the endwall connected to the trailing edge.

The outer peripheral surface of the endwall may be formed to have a highest radial height at a portion of the outer peripheral surface connected to the leading edge.

A radial height of the outer peripheral surface of the endwall may increase from the first rim seal to the portion of the outer peripheral surface connected to the leading edge and then decrease toward the trailing edge.

The outer peripheral surface of the endwall may include two concave parts positioned near an end edge of the pressure surface and positioned between a side portion of the leading edge and a side portion of the trailing edge.

The outer peripheral surface of the endwall may include two concave parts positioned near an end edge of the suction surface and positioned between a side portion of the leading edge and a side portion of the trailing edge.

As described above, according to the turbine blade and the gas turbine including the same of the present disclosure, a non-axisymmetric endwall contour having a plurality of convex portions and a plurality of concave portions is formed from a rim seal at a leading edge side so as to reduce a secondary vortex, thereby improving aerodynamic performance.

DETAILED DESCRIPTION

Figure 1:
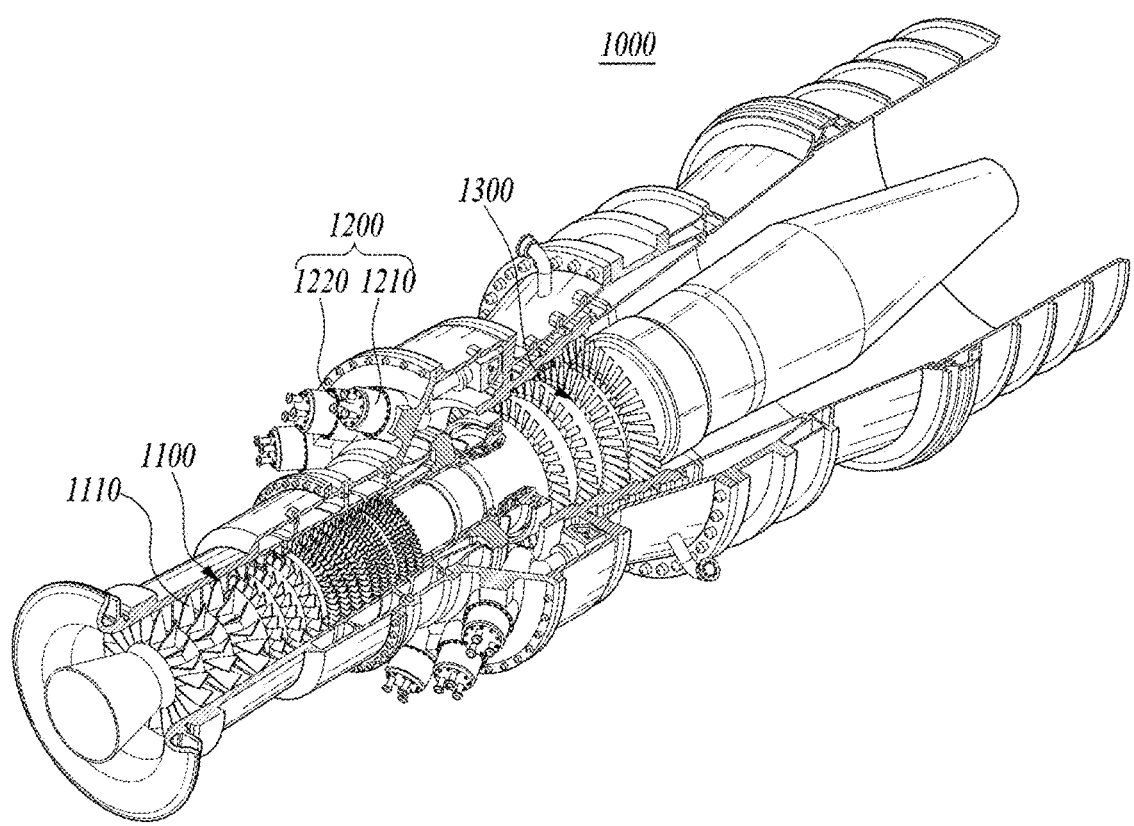
FIG. 1 is a cutaway perspective view of a portion of a gas turbine according to an embodiment of the present disclosure.

Since the present disclosure can be modified in various ways and can have various embodiments, specific embodiments will be exemplified and explained in detail in the detailed description. However, it should be noted that the present disclosure is not limited thereto, and may include all of modifications, equivalents, and substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It should be noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 2:
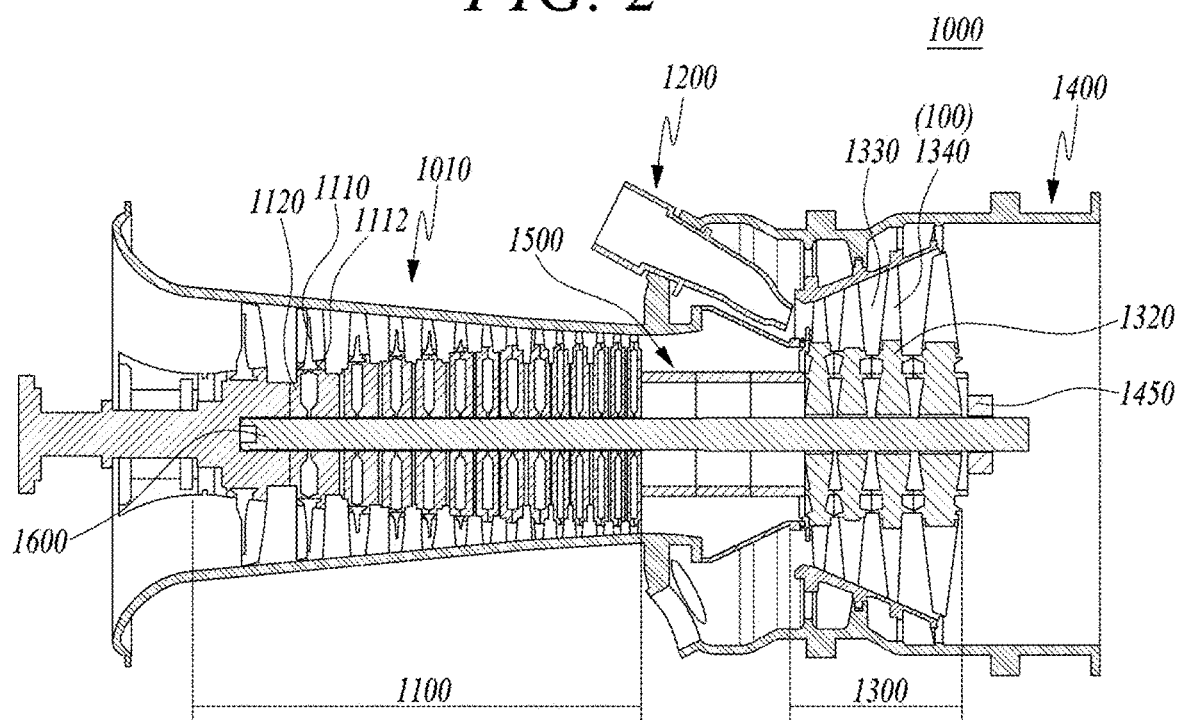
FIG. 2 is a cross-sectional view schematically showing the structure of the gas turbine according to an embodiment of the present disclosure.
Figure 3:
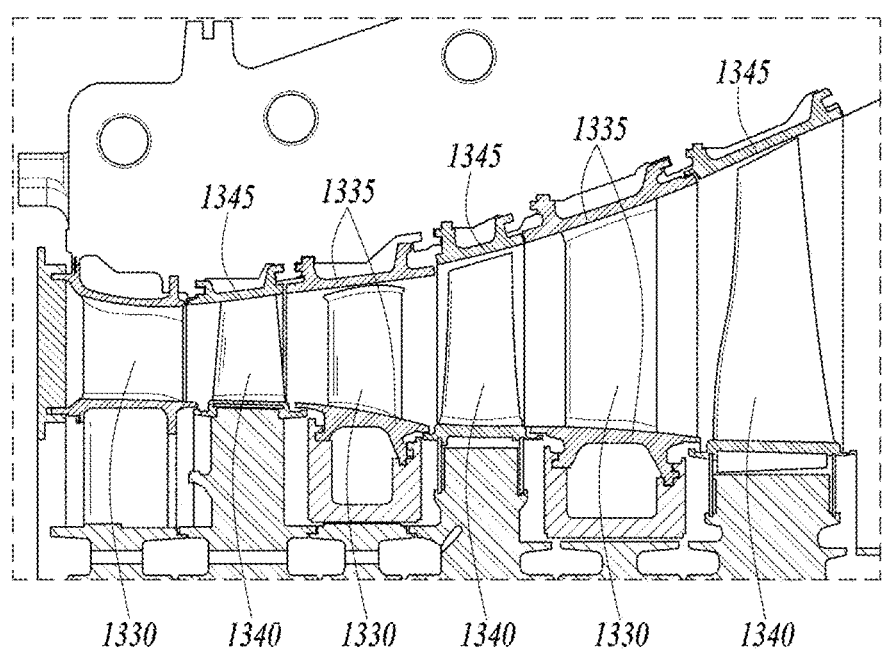
FIG. 3 is a partial cross-sectional view showing the internal structure of the gas turbine according to an embodiment of the present disclosure.

FIG. 1 is a cutaway perspective view of a portion of a gas turbine according to an embodiment of the present disclosure; FIG. 2 is a cross-sectional view schematically showing the structure of the gas turbine according to an embodiment of the present disclosure; and FIG. 3 is a partial cross-sectional view showing the internal structure of the gas turbine according to an embodiment of the present disclosure.

As illustrated in FIG. 1, a gas turbine 1000 according to an embodiment of the present disclosure includes a compressor 1100, a combustor 1200, and a turbine 1300. The compressor 1100 includes multiple blades 1110 installed radially. The compressor 1100 rotates the blades 1110, and air moves while being compressed by the rotation of the blades 1110. The size and installation angle of each of the blades 1110 may vary depending on an installation location.

In an embodiment, the compressor 1100 may be directly or indirectly connected to the turbine 1300 to receive some of power generated by the turbine 1300 and may rotate the blades 1110.

The air compressed from the compressor 1100 moves to the combustor 1200. The combustor 1200 includes a plurality of combustion chambers 1210 and fuel nozzle modules 1220 arranged in an annular configuration.

As illustrated in FIG. 2, the gas turbine 1000 according to an embodiment of the present disclosure has a housing 1010, wherein the housing 1010 has a diffuser 1400 provided at a rear side thereof so that combustion gas passing through the turbine is injected through the diffuser 1400. In addition, the combustor 1200, which receives and combusts compressed air, is arranged in front of the diffuser 1400.

In terms of the direction of air flow, the compressor 1100 is located at the upstream side of the housing 1010, and the turbine 1300 is located at the downstream side of the housing 1010. In addition, a torque tube unit 1500 as a torque transmission member that transmits rotational torque generated in the turbine 1300 to the compressor 1100 is arranged between the compressor 1100 and the turbine 1300.

The compressor 1100 is provided with a plurality of compressor rotor disks 1120 (e.g. 14 disks), and each of the compressor rotor disks 1120 is connected to each other by a tie rod 1600 so as not to be spaced apart from each other in an axial direction.

Specifically, each of the compressor rotor disks 1120 are aligned axially with each other while the tie rod 1600, which constitutes a rotational shaft of the compressor rotor disks 1120, passes roughly through the center thereof. Here, the neighboring compressor rotor disks 1120 have opposing surfaces pressed by the tie rod 1600 to prevent relative rotations thereof.

The compressor rotor disk 1120 has a plurality of blades 1110 coupled radially on an outer circumferential surface thereof. Each of the blades 1110 has a dovetail portion 1112 to be connected to the compressor rotor disk 1120.

A vane (not shown) is positioned between each of the compressor rotor disks 1120 by being fixed to the housing. The vane, unlike the rotor disk, is fixed so as not to rotate, and serves to align the flow of compressed air passing through the blades of the compressor rotor disk and to guide the air to the blades of the rotor disk located on the downstream side.

The fastening method of the dovetail portion 1112 includes a tangential-type method and an axial-type method. This may be selected according to the required structure of a commercially available gas turbine, and the dovetail portion 1112 may have a commonly known dovetail or fir-tree shape. In some cases, the blades may be fastened to the rotor disk by using fasteners other than those mentioned above, such as keys or bolts.

The tie rod 1600 is arranged to penetrate the centers of the plurality of compressor rotor disks 1120 and turbine rotor disks 1320. The tie rod 1600 may include one or a plurality of tie rods. A first end portion of the tie rod 1600 is fastened within the compressor rotor disk located on the most upstream side, and a second end portion of the tie rod 1600 is fastened by a fixing nut 1450.

The shape of the tie rod 1600 may have various structures depending on a gas turbine, and is not necessarily limited to the shape presented in FIG. 2. That is, as illustrated, one tie rod may have the form of penetrating the center of the rotor disk, or a plurality of tie rods may have a form arranged circumferentially, and a combination thereof is also possible.

Although not shown, the compressor of the gas turbine may have a vane that acts as a guide vane installed at a position next to the diffuser to adjust a flow angle of fluid entering the inlet of the combustor to a design flow angle after increasing the pressure of the fluid. This vane is called a deswirler.

In the combustor 1200, compressed air introduced thereto is mixed with fuel and combusted to produce high-temperature, high-pressure combustion gas with high energy, and the temperature of the combustion gas is increased to a heat resistance limit to which the combustor and turbine components can withstand through an isobaric combustion process.

The combustor, which constitutes the combustion system of the gas turbine, may include multiple combustors arranged within the housing formed in a cell shape, and may include a burner including a fuel injection nozzle, a combustor liner constituting a combustion chamber, and a transition piece that serves as a connection portion between the combustor and the turbine.

Specifically, the liner provides a combustion space in which fuel injected by a fuel nozzle is mixed with the compressed air of the compressor and combusted. Such a liner may include a flame tube providing a combustion space in which fuel mixed with air is combusted, and a flow sleeve forming an annular space while surrounding the flame tube. Additionally, the fuel nozzle is coupled to the front end of the liner, and a spark plug is coupled to a side wall of the liner.

Meanwhile, the transition piece is connected to the rear end of the liner so as to send combustion gas combusted by the spark plug to the turbine. The outer wall of the transition piece is cooled by compressed air supplied from the compressor to prevent damage caused by the high temperature of the combustion gas.

To this end, the transition piece is provided with holes for cooling so that air can be injected into the interior thereof, and the compressed air cools a body of the transition piece inside through the holes and then flows to the liner.

Cooling air that has cooled the aforementioned transition piece flows in the annular space of the liner, and compressed air from the outside of the flow sleeve is supplied as cooling air through cooling holes formed in the flow sleeve and impinges on the outer wall of the liner.

Meanwhile, high temperature and high pressure combustion gas from the combustor is supplied to the turbine 1300 described above. As the supplied high-temperature and high-pressure combustion gas expands, the gas collides with the rotating blades of the turbine, providing a reaction force to generate rotational torque. The rotational torque thus obtained is transmitted to the compressor through the torque tube described above, and any power exceeding power required to drive the compressor is used to drive a generator.

The turbine 1300 is basically similar in structure to the compressor. That is, the turbine 1300 is also provided with the plurality of turbine rotor disks 1320 similar to the compressor rotor disks of the compressor. Accordingly, the turbine rotor disks 1320 also include a plurality of turbine blades 1340 that are radially arranged. The turbine blades 1340 may also be coupled to the turbine rotor disks 1320 in a dovetail manner. In addition, a turbine vane 1330 fixed to the housing is provided between the turbine blades 1340 of the turbine rotor disks 1320 to guide the flow direction of combustion gas passing through the blades.

As illustrated in FIG. 3, the turbine vane 1330 is fixedly mounted within the housing by a vane carrier 1335. The vane carrier 1335 forms an endwall coupled to each of the inner and outer end portions of the turbine vane 1330. Meanwhile, a ring segment 1345 is mounted at a position facing the outer end portion of the turbine blade 1340 that rotates inside the housing such that a predetermined gap is formed between the ring segment 1345 and the outer end portion of the turbine blade 1340. That is, the gap between the ring segment 1345 and the outer end portion of the turbine blade 1340 forms a tip clearance.

Figure 4A:
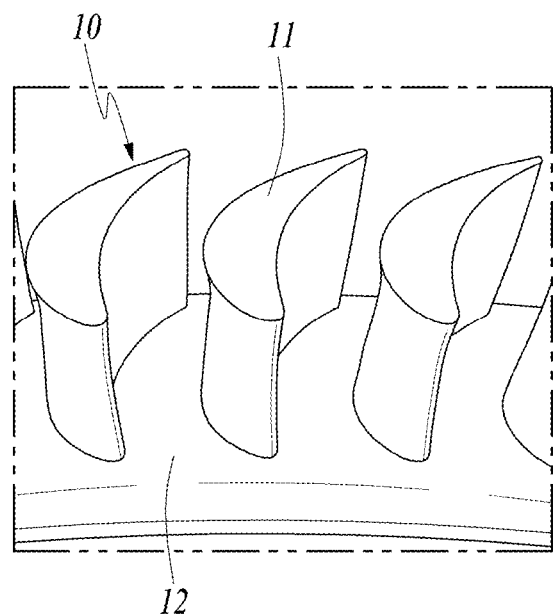
FIG. 4A is a partial perspective view showing a turbine blade according to a prior art.
Figure 4B:
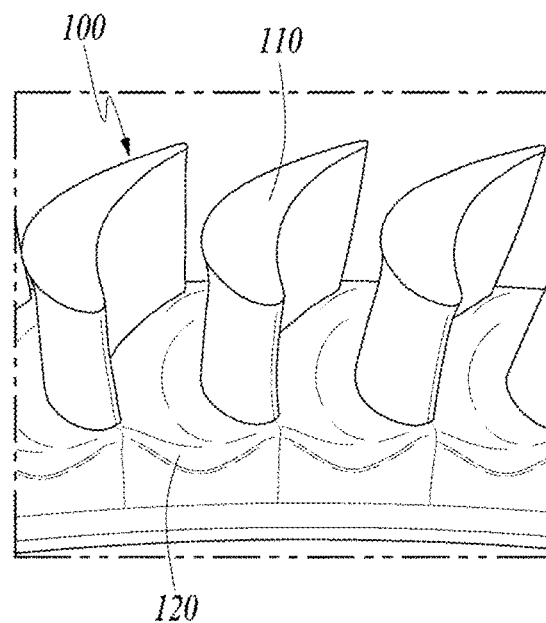
FIG. 4B is a partial perspective view showing a turbine blade according to an embodiment of the present disclosure.

FIG. 4A is a partial perspective view showing a turbine blade according to a prior art, and FIG. 4B is a partial perspective view showing a turbine blade according to an embodiment of the present disclosure.

A turbine blade 10 according to the prior art, as illustrated in FIG. 4A, includes an airfoil 11 and an endwall 12 integrally formed on the lower portion of the airfoil 11. The airfoil 11 includes a pressure surface, a suction surface, a leading edge, and a trailing edge. The outer peripheral surface of the endwall 12 appears to be in a nearly flat shape. However, technically speaking, the outer peripheral surface of the endwall 12 is formed as a curved surface with a constant radius of curvature about the rotation axis of the turbine 1300. Accordingly, the endwall 12 shown in FIG. 4A is axisymmetric relative to the rotation axis of the turbine 1300.

As illustrated in FIG. 4B, a turbine blade 100 according to an embodiment of the present disclosure includes an airfoil 110 and an endwall 120 integrally formed at the lower portion of the airfoil 110. The endwall 120 may have a rim seal formed on each of axial upstream and downstream sides. According to an embodiment, the outer circumferential surface of the endwall 120 may be formed as a smooth curved surface by being connected to the upper surface (i.e., outer circumferential surface) of the upstream rim seal.

Figure 5:
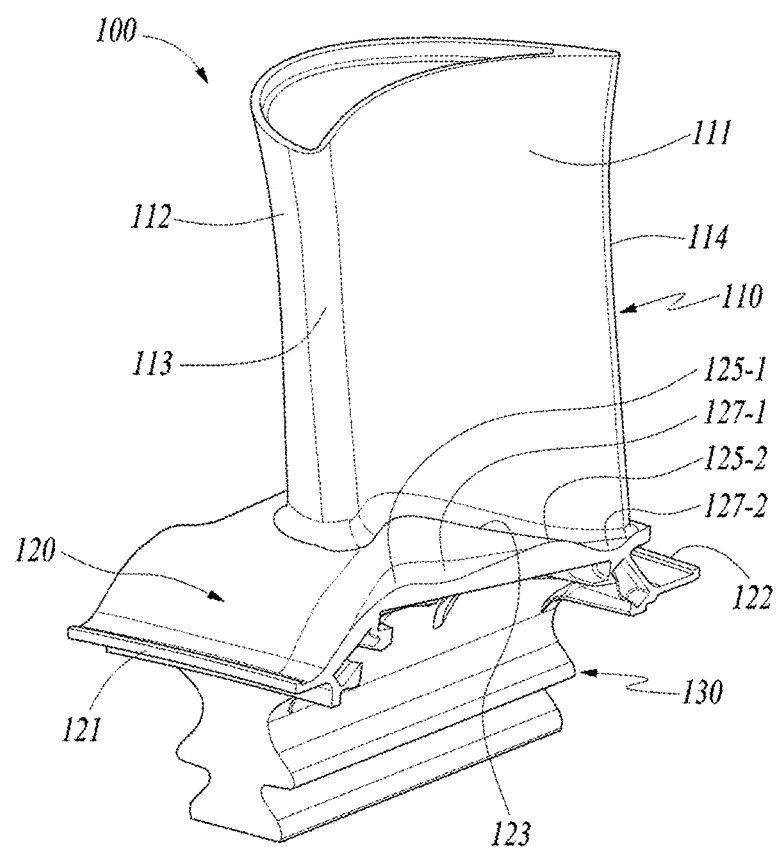
FIG. 5 is a perspective view showing the turbine blade according to an embodiment of the present disclosure.
Figure 6:
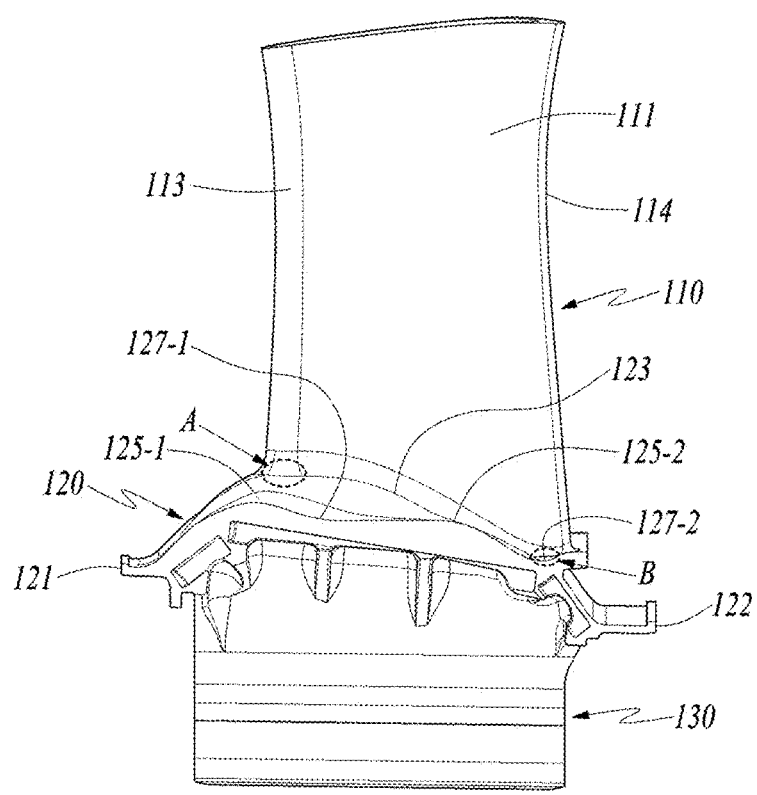
FIG. 6 is a perspective view of the turbine blade of FIG. 5 viewed from a pressure surface side.
Figure 7:
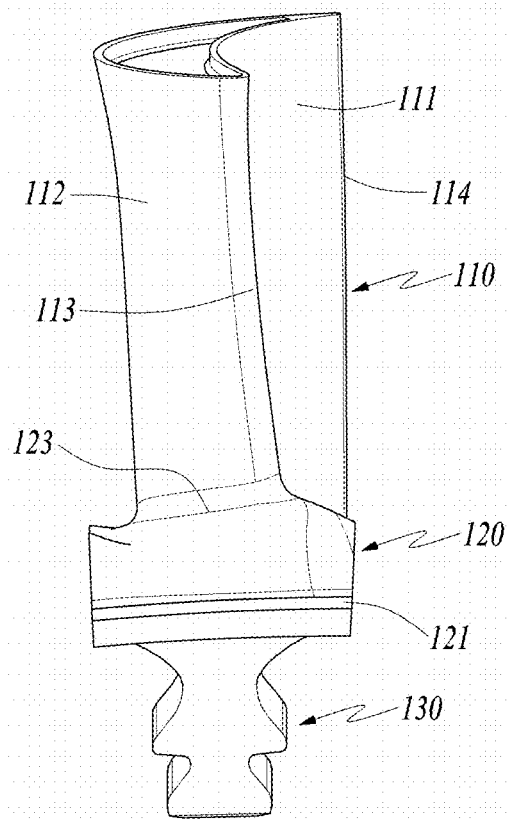
FIG. 7 is a perspective view of the turbine blade of FIG. 5 viewed from a leading edge side.
Figure 8:
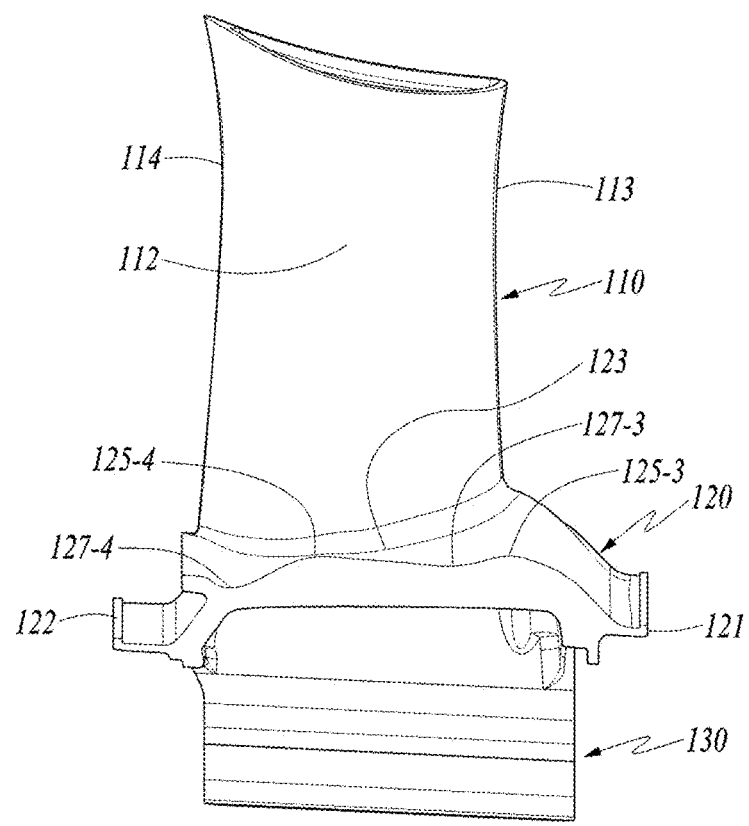
FIG. 8 is a perspective view of the turbine blade of FIG. 5 viewed from a suction surface side.

FIG. 5 is a perspective view showing the turbine blade according to an embodiment of the present disclosure, FIG. 6 is a perspective view of the turbine blade of FIG. 5 viewed from a pressure surface side, FIG. 7 is a perspective view of the turbine blade of FIG. 5 viewed from a leading edge side, and FIG. 8 is a perspective view of the turbine blade of FIG. 5 viewed from a suction surface side.

The turbine blade 100 according to an embodiment of the present disclosure includes the airfoil 110, the endwall 120 integrally formed on a lower portion of the airfoil, and a root part 130 integrally formed on a lower portion of the endwall 120. A surface part or a position of the endwall 120 at which the endwall 120 meets the airfoil 110 may be referred to a connecting part 123.

The airfoil 110 includes the pressure surface 111 formed concavely on a first side surface thereof, the suction surface 112 formed convexly on a second side surface thereof, the leading edge 113 formed on an upstream edge, and the trailing edge 114 formed on a downstream end portion.

A direction in which the root part 130 is extended under the endwall 120 may be referred to as an axial direction, defining upstream and downstream along the axial direction. A circumferential direction from the suction surface 112 toward the pressure surface 111 may be referred to as a pressure side circumferential direction or a circumferentially pressure side, and an opposite direction to the pressure side circumferential direction may be referred to as a suction side circumferential direction or a circumferentially suction side.

The endwall 120 may be integrally connected to the lower portion of the airfoil 110, that is, a radially inner end portion thereof. An outer surface of the endwall 120 may be formed as a curved surface from a rim seal at a first end (i.e., an upstream end) of the endwall 120 to a second end (i.e., a downstream end) of the endwall 120.

The endwall 120 may include a first rim seal 121 extending upstream from an upstream side of the endwall 120 before a position of the leading edge 113 and a second rim seal 122 extending downstream from a downstream side of the endwall 120 after a position of the trailing edge 114.

A plurality of turbine blades 100 are mounted on the circumference of each of the turbine rotor disks 1320. The first rim seal 121 of the endwall 120 of a turbine blade 100 may be formed to seal a gap between an upstream turbine vane 1330, which is a stationary element, and the said turbine blade 100. The second rim seal 122 of the endwall 120 of the turbine blade 100 may be formed to seal a gap between a downstream turbine vane 1330, which is a stationary element, and the said turbine blade 100.

The outer peripheral surface of the endwall 120 may be formed in general as a streamlined curved surface connected between the first rim seal 121 and an end portion of the endwall 120 on a side of the trailing edge 114.

As illustrated in FIG. 5, the upper surface of the endwall 120 may be formed as a smooth and streamlined curved surface continuing from the upper surface of the first rim seal 121.

The second rim seal 122 may be positioned at a radial height lower than that of a portion of the outer peripheral surface of the endwall 120 connected to the trailing edge 114.

The second rim seal 122 may be formed to extend radially inwardly and downstream from the downstream end edge of the outer peripheral surface of the endwall 120. The second rim seal 122 may be formed to extend from a lower surface of the endwall 120 from a position slightly upstream than a tip of the downstream end edge of the endwall 120.

As illustrated in FIG. 6, the first rim seal 121 may be positioned slightly higher in the radial direction than the second rim seal 122, while the radial height of the first rim seal 121 may be slightly lower than the downstream end edge of the outer peripheral surface of the endwall 120.

As illustrated in FIGS. 5 and 6, the outer peripheral surface of the endwall 120 may be formed to have a highest radial height at a portion of the connecting part 123 (i.e., a portion A) that is connected to the leading edge 113 of the airfoil 110.

The portion A of the connecting part 123 at which the outer peripheral surface of the endwall 120 is connected to the radially inner end portion of the leading edge 113 of the airfoil 110 may be formed to have the highest radial height. According to an embodiment, the portion A of the connecting part 123 may be formed with a convex curved surface when viewed from a pressure surface side of the blade 100. According to an embodiment, the portion A of the connecting part 123 may include a partially flat portion, which has the highest radial height.

Meanwhile, a portion B of the connecting part 123 immediately before (i.e., at a position immediately upstream than) the trailing edge 114 may be formed to have the lowest radial height. In other words, according to an embodiment, a portion of the connecting part 123 connected to the radially inner end portion of the trailing edge 114 may have a higher radial height than the one of the portion B of the connecting part 123. According to an embodiment, the portion B of the connecting part 123 may be formed with a concaved curved surface.

The radial height of the outer peripheral surface of the endwall 120 may increase from the first rim seal 121 to a portion of the outer peripheral surface connected to the leading edge 113 and then decrease toward the trailing edge 114.

According to an embodiment, a position where the second rim seal 122 starts to extend radially inwardly and downstream from a lower surface of the endwall 120 may be positioned between, in the axial direction, the portion B and the portion of the connecting part 123 connected to the radially inner end portion of the trailing edge 114 (i.e., positioned downstream than the portion B and upstream than the portion of the connecting part 123 connected to the radially inner end portion of the trailing edge 114).

As illustrated in FIGS. 5 and 6, according to an embodiment, the outer peripheral surface of the endwall 120 may include two concave parts 127 near the end edge of the pressure surface 111 between, in the axial direction, a side portion of the leading edge 113 and a side portion of the trailing edge 114. The two concave parts 127 may be positioned at a circumferentially pressure side end edge of the outer peripheral surface of the endwall 120.

The outer peripheral surface of the endwall 120 may have a first convex part 125-1 and a second convex part 125-2 at the circumferentially pressure side end edge of the outer peripheral surface of the endwall 120.

The first convex part 125-1 may be formed near, or substantially same axial location with, a portion of the outer peripheral surface connected to the leading edge 113 at the side of the pressure surface 111 of the airfoil 110. In addition, the second convex part 125-2 may be formed at an axial location slightly downstream of a middle portion of the side of the pressure surface 111. On the outer peripheral surface of the endwall 120, the second convex part 125-2 may be formed to be radially higher at an axial end edge portion thereof than the connecting part 123 which is the radially lower end of the pressure surface 111.

On the outer peripheral surface of the endwall 120, a first concave part 127-1 may be positioned slightly downstream, in the axial direction, than a portion of the outer peripheral surface connected to the leading edge 113. The first concave part 127-1 may be formed to be lower at an axial end edge portion thereof than the connecting part 123 which is the lower end of the pressure surface 111.

On the outer peripheral surface of the endwall 120, a second concave part 127-2 may be positioned slightly upstream, in the axial direction, than a portion of the outer peripheral surface connected to the trailing edge 114. The second concave part 127-2 may be formed to be lower at an axial end edge portion thereof than the connecting part 123 which is the lower end of the pressure surface 111. According to an embodiment, the second concave part 127-2 may correspond to portion B of the connecting part 123.

The radial height of the outer peripheral surface of the endwall 120 may increase from the first rim seal 121 through the portion of the connecting part 123 connected to the leading edge 113 to the first convex part 125-1, then generally decrease to the second concave part 127-2, and increase again toward a rear end of the connecting part 123 at which the outer peripheral surface is connected to the trailing edge 114, along the axial direction.

The outer peripheral surface of the endwall 120 may have a third convex part 125-3, a fourth convex part 125-4, a third concave part 127-3, and a fourth concave part 127-4 at the circumferentially suction side end edge of the outer peripheral surface of the end wall 120. The third convex part 125-3, the fourth convex part 125-4, the third concave part 127-3, and the fourth concave part 127-4 may be positioned substantially along the same axial locations as the first convex part 125-1, the second convex part 125-2, the third concave part 127-3, and the fourth concave 127-4. This arrangement ensures that, when turbine blades 100 are assembled, the concave parts and the convex parts of one turbine blade may align with the corresponding concave parts and the convex parts of an adjacent turbine blade, thereby mitigate the secondary vortex.

As illustrated in FIG. 8, according to an embodiment, the outer peripheral surface of the endwall 120 may include two concave parts 127 near the end edge of the suction surface 112 between, in the axial direction, a side portion of the leading edge 113 and a side portion of the trailing edge 114. The two concave parts 127 may be positioned at a circumferentially suction side end edge of the outer peripheral surface of the endwall 120.

On the basis of the axial end edge portion of the suction surface 112 on the outer peripheral surface of the endwall 120, the third convex part 125-3, the third concave part 127-3, the fourth convex part 125-4, and the fourth concave part 127-4 may be formed in sequence in a downstream direction from an upstream side.

The third convex part 125-3 may be positioned at the same axial location as the leading edge 113, or slightly upstream of the leading edge 113, with respect to the flow direction of combustion gas.

On the outer peripheral surface of the endwall 120, the third concave part 127-3 may be formed to be the lowest at an axial end edge thereof at a connection portion thereof with the suction surface 112 at a side downstream from the leading edge 113. According to an embodiment, on the outer peripheral surface of the endwall 120, the third concave part 127-3 may be positioned slightly downstream, in the axial direction, than a portion of the outer peripheral surface connected to the leading edge 113. The third concave part 127-3 may be formed to be lower at an axial end edge portion thereof than the connecting part 123 which is the lower end of the suction surface 112.

The fourth convex part 125-4 may be formed at an axial location slightly downstream of the middle portion of the suction surface 112. On the outer peripheral surface of the endwall 120, the fourth convex part 125-4 may be formed to be radially higher at an axial end edge portion thereof than the portion of the outer peripheral surface connected to the lower end of the suction surface 112.

The fourth concave part 127-4 is formed to be the lowest at an axial end edge thereof at a connection portion thereof with the trailing edge 114, and may be arranged between the fourth convex part 125-4 and the connection portion with the trailing edge 114.

Figure 9:
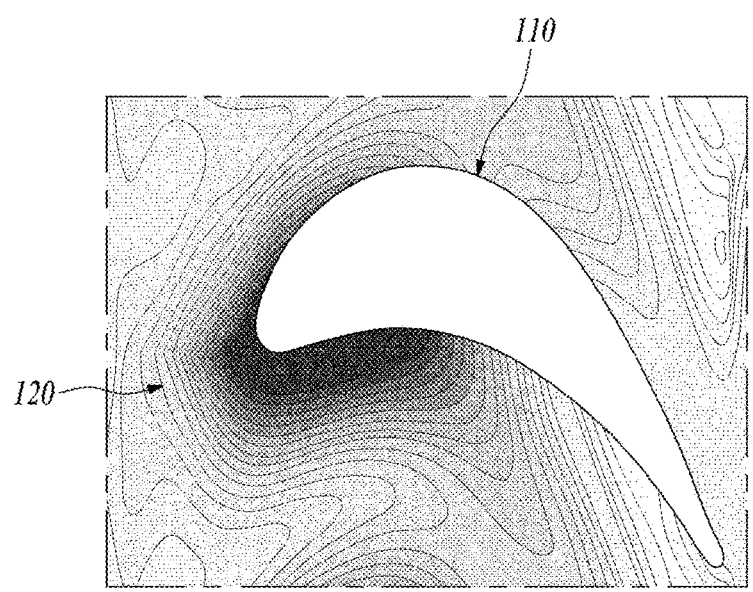
FIG. 9 is a top view showing the height of the outer peripheral surface of an endwall in the turbine blade with contour lines according to an embodiment of the present disclosure.

FIG. 9 is a top view showing the radial height of the outer peripheral surface of an endwall in the turbine blade with contour lines according to an embodiment of the present disclosure. Each of the contour lines indicate the same radial height.

In the turbine blade, the outer peripheral surface of the endwall 120 may be formed to have a high radial height at the leading edge of the airfoil 110 and the region upstream of the pressure surface. The outer peripheral surface of the endwall 120 may be formed to have a lower radial height in a region in which the outer peripheral surface meets the trailing edge of the airfoil 110.

When the axial chord length of the airfoil 110 of the turbine blade is Cx, the radial height of the outer peripheral surface of the endwall 120 may be within a range of ±0.2 Cx. For example, when Cx is approximately 100 mm, the outer peripheral surface of the endwall 120 may be formed within a range of −20 mm to +20 mm with respect to a reference surface, and particularly may be formed within a range of −10 mm to +15 mm. In FIG. 9, contour lines may be displayed at radial height differences of 2 mm.

Figure 10A:
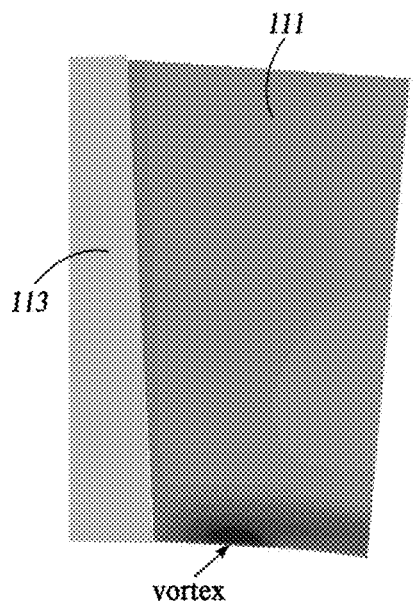
FIG. 10A is a photograph showing a secondary vortex generated in the turbine blade according to the prior art.
Figure 10B:
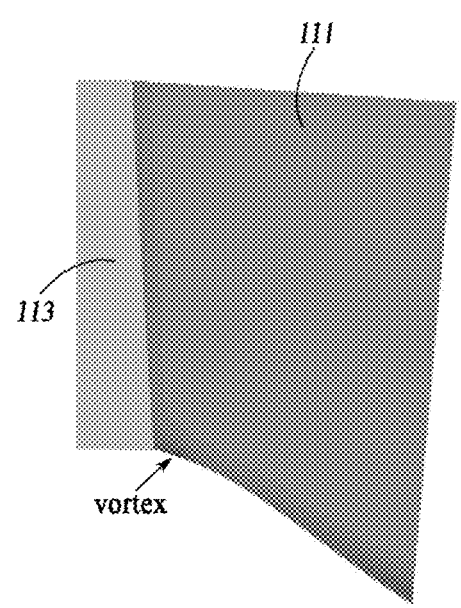
FIG. 10B is a photograph showing a secondary vortex generated in the turbine blade according to an embodiment of the present disclosure.

FIG. 10A is a photograph showing a secondary vortex generated in the turbine blade according to the prior art, and FIG. 10B is a photograph showing a secondary vortex generated in the turbine blade according to an embodiment of the present disclosure.

As illustrated in FIG. 10A, in the turbine blade 10 according to the prior art of FIG. 4A, it can be seen that a large secondary vortex is generated at a portion downstream of the leading edge 113 near the connection portion between the outer peripheral surface of the endwall 120 and the pressure surface 111.

On the other hand, as illustrated in FIG. 10B, in the turbine blade 100 according to the present disclosure of FIG. 5, it can be seen that a secondary vortex that occurs at a portion immediately following the leading edge 113 near the connection portion between the pressure surface 111 and the outer peripheral surface of the endwall 120 is significantly reduced.

Figure 11:
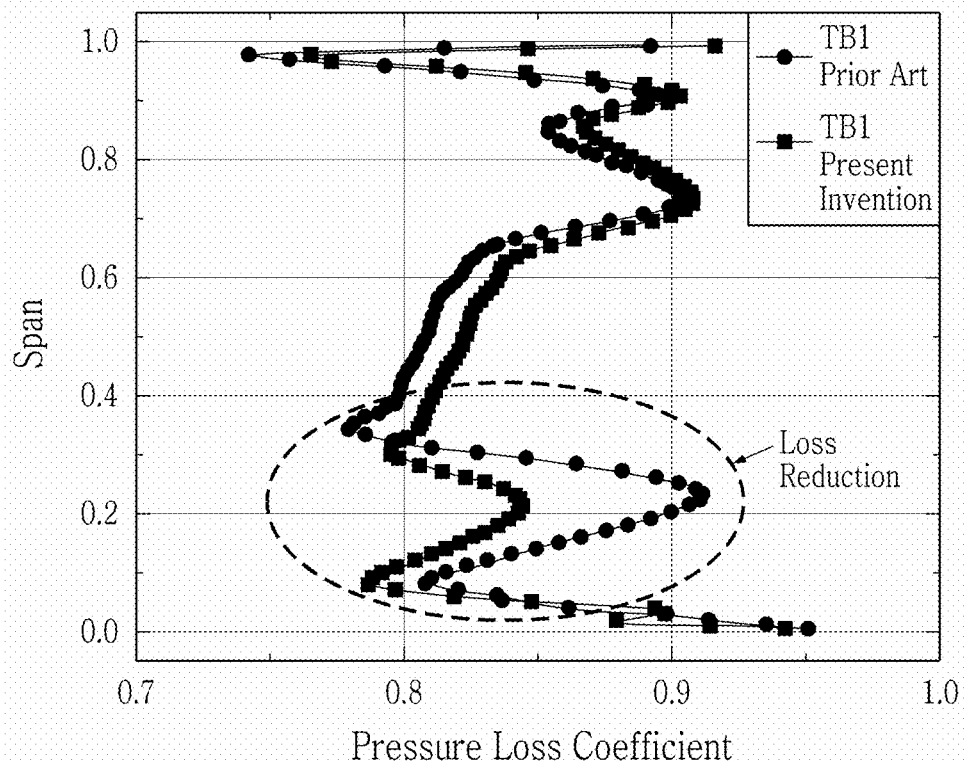
FIG. 11 is a graph showing pressure loss according to a position of a span in the turbine blade according to the prior art and in the turbine blade according to an embodiment of the present disclosure.

FIG. 11 is a graph showing pressure loss according to a position of a span in the turbine blade according to the prior art and in the turbine blade according to an embodiment of the present disclosure.

FIG. 11 shows total pressure loss coefficient at the turbine blade exit plane of the first stage of the turbine. For the turbine blade of the present disclosure, it can be seen that the total pressure loss coefficient is reduced compared to the prior art, especially in the span range of 0.1 to 0.3.

According to the turbine blade of the present disclosure, it was seen that the stage efficiency of the first stage was improved compared to the prior art, and overall turbine efficiency was also improved.

In addition, when the endwall shape of the present disclosure was applied, it was confirmed that compared to the prior art, the efficiency of the gas turbine was improved, the efficiency of the combined cycle of the gas turbine and steam turbine was improved by about 0.05%, the output of the gas turbine was improved, and the output of the combined cycle was improved.

According to the turbine blade and the gas turbine including the same of the present disclosure, a non-axisymmetric endwall contour having a plurality of convex portions and a plurality of concave portions is formed from a rim seal at a leading edge side so as to reduce a secondary vortex, thereby improving aerodynamic performance and efficiency.

While the embodiments of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure.

The invention claimed is:

1. A turbine blade comprising:
an airfoil comprising a pressure surface, a suction surface, a leading edge, and a trailing edge, the leading edge and the trailing edge disposed at an upstream side and a downstream side in an axial direction, respectively;
an endwall formed integrally on a lower portion of the airfoil; and
a root part formed integrally on a lower portion of the endwall,
wherein an outer peripheral surface of the endwall is formed with a curved surface formed from a first rim seal positioned at the upstream side of the endwall to a downstream end of the endwall,
wherein the outer peripheral surface of the endwall is formed to have a highest radial height portion,
wherein the highest radial height portion begins, in the axial direction, from a position where the outer peripheral surface meets an upstream end of the leading edge,
wherein the endwall comprises:
the first rim seal extending upstream from a position of the leading edge; and
a second rim seal extending downstream from a position of the trailing edge,
wherein the outer peripheral surface of the endwall comprises a first concave part and a second concave part positioned near an end edge of the pressure surface and positioned between a side portion of the leading edge and a side portion of the trailing edge, the first concave part being positioned upstream than the second concave part,
wherein a radial height of the outer peripheral surface of the endwall is lower at the second concave part than at the first concave part, is lowest at the second concave part, and continuously increases from the second concave part to the downstream end of the endwall.

2. The turbine blade of claim 1, wherein the outer peripheral surface of the endwall is formed as a streamlined curved surface connected between the first rim seal and an end portion of the outer peripheral surface on a side of the trailing edge.

3. The turbine blade of claim 2, wherein the second rim seal is arranged to be lower than a radial height of a portion of the outer peripheral surface of the endwall connected to the trailing edge.

4. The turbine blade of claim 2, wherein the radial height of the outer peripheral surface of the endwall increases from the first rim seal to the portion of the outer peripheral surface connected to the leading edge and then generally decreases toward the trailing edge.

5. The turbine blade of claim 4, wherein the outer peripheral surface of the endwall comprises a third concave part and a fourth concave part positioned near an end edge of the suction surface and positioned between a side portion of the leading edge and a side portion of the trailing edge, the third concave part being positioned upstream than the fourth concave part.

6. The turbine blade of claim 1, wherein the first rim seal, the endwall, and the second rim seal are arranged such that a radial height of the first rim seal is lower than a radial height of the downstream side of the endwall and higher than a radial height of the second rim seal.

7. The turbine blade of claim 1, wherein the highest radial height portion of the outer peripheral surface of the endwall includes a flat portion, such that the flat portion has a constant radial height.

8. A gas turbine comprising:
a compressor configured to take in and compress external air;
a combustor configured to mix fuel with the air compressed by the compressor and combust the fuel mixed with the air; and
a turbine in which turbine blades and turbine vanes are mounted inside a turbine housing, with each of the turbine blades being rotated by combustion gas discharged from the combustor, wherein the turbine blade comprises:
an airfoil comprising a pressure surface, a suction surface, a leading edge, and a trailing edge, the leading edge and the trailing edge disposed at an upstream side and a downstream side in an axial direction, respectively;

an endwall formed integrally on a lower portion of the airfoil; and a root part formed integrally on a lower portion of the endwall, wherein an outer peripheral surface of the endwall is formed with a curved surface formed from a first rim seal positioned at the upstream side of the endwall to a downstream end of the endwall, wherein the outer peripheral surface of the endwall is formed to have a highest radial height portion, wherein the highest radial height portion begins in the axial direction from a position where the outer peripheral surface meets an upstream end of the leading edge, wherein the endwall comprises:

the first rim seal extending upstream from a position of the leading edge; and a second rim seal extending downstream from a position of the trailing edge, wherein the outer peripheral surface of the endwall comprises a first concave part and a second concave part positioned near an end edge of the pressure surface and positioned between a side portion of the leading edge and a side portion of the trailing edge, the first concave part being positioned upstream than the second concave part, wherein a radial height of the outer peripheral surface of the endwall is lower at the second concave part than at the first concave part, is lowest at the second concave part, and continuously increases from the second concave part to the downstream end of the endwall.

9. The gas turbine of claim 8, wherein the outer peripheral surface of the endwall is formed as a streamlined curved surface connected between the first rim seal and an end portion of the outer peripheral surface on a side of the trailing edge.

10. The gas turbine of claim 9, wherein the second rim seal is arranged to be lower than a radial height of a portion of the outer peripheral surface of the endwall connected to the trailing edge.

11. The gas turbine of claim 9, wherein the radial height of the outer peripheral surface of the endwall increases from the first rim seal to the portion of the outer peripheral surface connected to the leading edge and then generally decreases toward the trailing edge.

12. The gas turbine of claim 11, wherein the outer peripheral surface of the endwall comprises a third concave part and a fourth concave part positioned near an end edge of the suction surface and positioned between a side portion of the leading edge and a side portion of the trailing edge, the third concave part being positioned upstream than the fourth concave part.

* * * * *